(12) United States Patent
Yin et al.

(10) Patent No.: US 11,284,035 B2
(45) Date of Patent: Mar. 22, 2022

(54) DATA TRANSMISSION SYSTEM HAVING MULTIPLE LINE BUFFER MEMORIES FOR IMAGE SENSOR

(71) Applicant: Guangzhou Tyrafos Semiconductor Technologies Co., Ltd., Guangzhou (CN)

(72) Inventors: Ping-Hung Yin, Taipei (TW); Jia-Shyang Wang, Miaoli County (TW); Pei-Ting Tsai, Hsinchu County (TW)

(73) Assignee: Guangzhou Tyrafos Semiconductor Tech. Co., Ltd., Guangzhou (CN)

( * ) Notice: Subject to any disclaimer, the term of this patent is extended or adjusted under 35 U.S.C. 154(b) by 15 days.

(21) Appl. No.: 16/903,471

(22) Filed: Jun. 17, 2020

(65) Prior Publication Data
US 2021/0176418 A1    Jun. 10, 2021

Related U.S. Application Data

(60) Provisional application No. 62/945,250, filed on Dec. 9, 2019.

(51) Int. Cl.
| | | |
|---|---|---|
| *H04N 5/378* | (2011.01) | |
| *H04N 5/3745* | (2011.01) | |
| *G06V 40/60* | (2022.01) | |
| *G06V 40/13* | (2022.01) | |
| *G06V 40/12* | (2022.01) | |

(52) U.S. Cl.
CPC ......... *H04N 5/378* (2013.01); *G06V 40/1312* (2022.01); *G06V 40/1318* (2022.01); *G06V 40/1324* (2022.01); *G06V 40/1365* (2022.01); *G06V 40/1394* (2022.01); *G06V 40/63* (2022.01); *H04N 5/37455* (2013.01)

(58) Field of Classification Search
CPC .......................... H04N 5/378; H04N 5/37455
See application file for complete search history.

(56) References Cited

U.S. PATENT DOCUMENTS

| | | | | |
|---|---|---|---|---|
| 2004/0109065 | A1* | 6/2004 | Tokunaga | H04N 5/335 348/207.99 |
| 2007/0146170 | A1* | 6/2007 | Chen | H04N 5/14 341/50 |
| 2011/0085065 | A1* | 4/2011 | Egawa | H04N 5/378 348/294 |
| 2017/0295334 | A1* | 10/2017 | Chuang | H04N 5/37213 |

* cited by examiner

*Primary Examiner* — Nicholas G Giles
(74) *Attorney, Agent, or Firm* — Lin & Associates Intellectual Property, Inc.

(57) ABSTRACT

Provided is a data transmission system including analog image frame buffer, line analog-to-digital converter, line buffer memory, and an interface. First, the analog image frame buffer stores the image data lines generated from the image sensor as analog signals, and then the line analog digital converter which is electrically connected to the analog image frame buffer converts the image data lines from analog signals to digital signals. Then, the image data lines converted into digital signals are stored in one of the line buffer memories. Then, according to the user's needs, the image data line of the digital signal is temporarily stored in another line buffer memory. Finally, according to the instructions of the master device, the interface outputs the image data lines of digital signals according to the conversion order of the line analog to digital converter.

14 Claims, 10 Drawing Sheets

DATA TRANSMISSION SYSTEM HAVING MULTIPLE LINE BUFFER MEMORIES FOR IMAGE SENSOR

CROSS-REFERENCE TO RELATED APPLICATION

This application claims the priority of U.S. provisional application No. 62/945,250, filed on Dec. 9, 2019, which is incorporated herewith by reference.

BACKGROUND OF THE INVENTION

1. Field of the Invention

The present invention relates to an operation science, in particular to a data transmission system operating according to determination of line buffer memory allocation.

2. The Prior Arts

The application of smart image sensing technology has developed rapidly in recent years. In addition, the image sensors familiar on the market in the past have gradually extended from the smartphone to fields like automotive, industrial, and medical, wherein CMOS image sensor (CIS) is the most commonly used image sensor on the market. So far the CIS image sensor that is a slave device under the master-slave transmission architecture generally stores sensing signals outputted from pixel units digitally, so this type of CIS image sensor needs to be equipped with a digital frame buffer.

However, with the miniaturization of electronic devices, the CIS image sensor equipped with a digital frame register cannot effectively reduce the size. Taking a smartphone as an example, smartphones in the past were only equipped with front and rear single cameras, only two CIS image sensors are required, but smartphones in recent years have significantly increased functions. In the case where the front camera needs to be equipped with 3D sensing functions, at least four CIS image sensors are currently required on smartphones on the market. In view of this, how to reduce the size and cost of CIS image sensor is one of the problems that R & D personnel should solve.

SUMMARY OF THE INVENTION

An objective of the present invention is to provide a data transmission system which applies the method according to the present invention, replaces a digital frame register originally required by an image sensor with line buffer memories with an amount greater than or equal to twice of that of line analog-to-digital converters to perform image sensing technology and effectively reduce the size and cost of the image sensor.

Another objective of the present invention is to provide a data transmission system which adjusts a frequency of the line analog-to-digital converter converting the image data lines, so that the line analog-to-digital converter no longer generates dummy image data lines, the line analog to digital converter conversion efficiency is greatly increased, and the applicability of the data transmission system according to the present invention is improved.

To achieve the objects mentioned above, a data transmission system is provided by the present invention and including: An analog image frame buffer, at least one line analog to digital converter, at least two line buffer memories and an interface. The analog image frame buffer stores a plurality of image data lines generated from an image sensor as analog signals, the image data lines include a first image data line and a second image data line. The at least a line analog to digital converter electrically connected to the analog image frame buffer converts the image data lines from analog signals to digital signals. The at least two line buffer memories electrically connected to the line analog converter store the image data lines converted into digital signals in the line buffer memories, the line buffer memories include a first line buffer memory and a second line buffer memory. The interface electrically connected to the line buffer memories sequentially outputs the image data lines according to instructions of a master device. A number of the line buffer memories is larger than or equal to twice of a number of the line analog to digital converters.

Preferably, the analog image frame buffer according to the present invention can be combined with a pixel array, that is, the analog image frame buffer and the pixel array occupy the same space. In this way, in comparison with the digital image frame buffer being used, the digital image frame buffer and the pixel array are separately configured and additional space is required, the analog image frame buffer is combined with the pixel array to effectively reduce the space of the image sensor.

Preferably, according to the data transmission system of the present invention, wherein a frequency of the at least one line analog-to-digital converter converting the image data lines may be a constant. While the line buffer memory does not have space to store the image data lines, the image data lines converted by the at least one line analog-to-digital converter are dummy image data lines (dummy ADC).

Preferably, according to the data transmission system of the present invention, wherein a frequency of the at least one line analog to digital converter converting the image data lines is not constant.

Preferably, according to the data transmission system of the present invention, wherein when the interface sequentially outputs the image data lines, the master device confirms that the line buffer memories are set by polling.

Preferably, according to the data transmission system of the present invention, wherein when the interface sequentially outputs the image data lines, the master device does not need to confirm whether the line buffer memory is set, and the data can be continuously received.

Preferably, according to the data transmission system of the present invention, the data transmission system may further include at least two multiplexers including a first multiplexer and a second multiplexer; wherein the first multiplexer is arranged between the line analog to digital converter and the line buffer memories, the first multiplexer transmits the first image data to one of the line buffer memories and transmits the second image data to another one of the line buffer memories; the second multiplexer is arranged between the line buffer memories and the interface, and the second multiplexer sequentially transmits the image data lines to the interface according to an order of conversion of the line analog to digital converter.

Preferably, according to the data transmission system of the present invention, wherein the interface may be a serial peripheral interface (SPI), but not limited thereto.

Further, to achieve the objects mentioned above, a method for performing the data transmission system is provided by the present invention based on the aforementioned data transmission system and including: a storing step using an analog image frame buffer to store a plurality of image data lines generated from an image sensor as analog signals wherein the image data lines include a first image data line and a second image data line; a converting step using at least a line analog to digital converter to convert the image data lines from analog signals to digital signals; a transmitting step transmitting and storing the first image data line of the digital signals in one of the at least two line buffer memories; a temporarily storing step storing the second image data line of the digital signals in one of the at least two line buffer memories; and an outputting step using an interface to sequentially output the image data lines according to instructions of a master device.

Preferably, according to the data transmission system of the present invention, wherein the first image data line of the digital signals is transmitted from the first line buffer memory and stored in the second line buffer memory in the temporarily storing step.

Preferably, according to the data transmission system of the present invention, in the temporary storing step, the second image data line of the digital signals can be transmitted and stored in the second line buffer memory; and a selecting step can be further included between the temporarily storing step and the outputting step, which uses a multiplexer to sequentially transmit the image data lines of the digital signals to the interface according to an order of conversion of the line analog to digital converter.

In summary, the data transmission system and the data transmission method provided by the present invention mainly replace a digital frame register originally required by an image sensor with two line buffer memories to perform image sensing technology, and adjust the frequency of the line analog-to-digital converter converting image data lines, so that the line analog-to-digital converter no longer generates dummy image data lines, and thus the required space and the cost can be reduced, and the applicability can be expanded.

In order to make those skilled in the art understand the purpose, features and effects of the present invention, the following specific embodiments and the accompanying drawings are used to describe the present invention in detail below.

DETAILED DESCRIPTION OF THE PREFERRED EMBODIMENT

Figure 1:
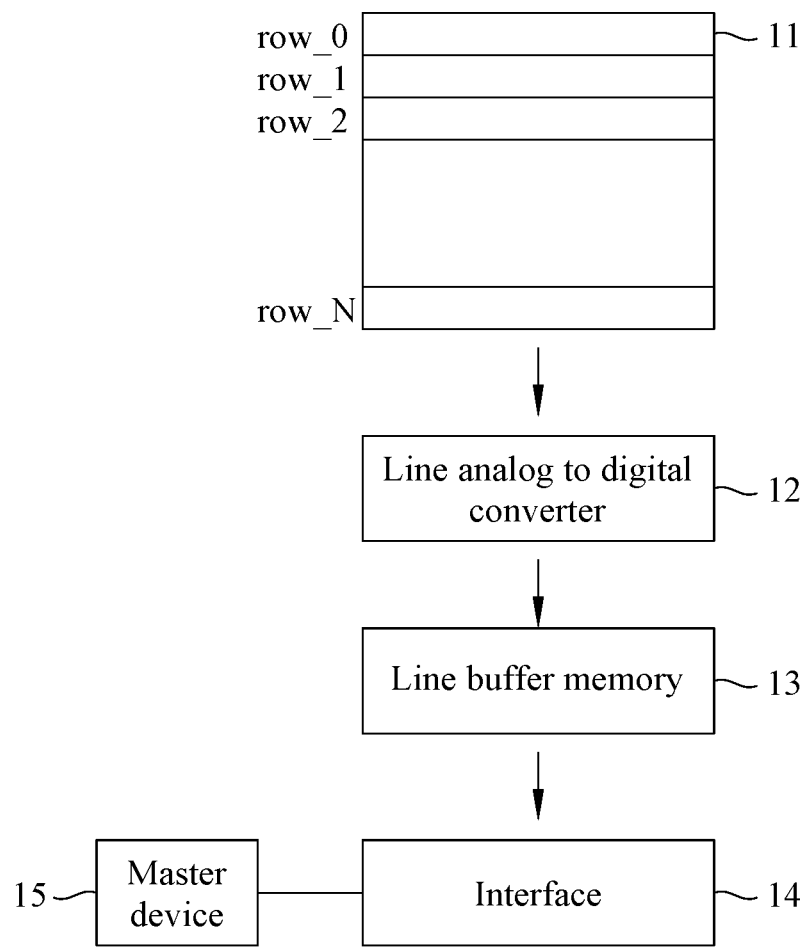
FIG. 1 is a schematic diagram of a data transmission system according to the present invention.

The following is a more detailed description of the embodiments of the present invention in companion with drawings and component symbols, so that those who have ordinary knowledge in the technical field can study and implement this specification after studying.

However, the present invention is not limited to the embodiments disclosed herein, but will be implemented in various forms.

The following embodiments are provided as examples only, so that those of ordinary skill in the art can fully understand the disclosure of the present invention and the scope of the present invention disclosed.

Therefore, the present invention will be limited only by the scope of the attached claims.

The drawings used to describe various embodiments of the present invention, the shape, size, ratio, number, etc. shown are merely exemplary, and the present invention is not limited thereto.

In this specification, the same reference numerals generally indicate the same elements.

Unless explicit explanation further stated, any reference to the singular may include the plural.

FIG. 1 is a schematic diagram of a data transmission system according to the present invention. As shown in FIG. 1, the data transmission system 1 according to the present invention includes: an analog image frame buffer 11, a line analog to digital converters 12, a line buffer memory 13 and an interface 14; wherein a number of the line buffer memories 13 is greater than or equal to twice of a number of the line analog to digital converters 12.

Specifically, the analog image frame buffer 11 according to the present invention stores a plurality of image data lines generated from an image sensor (not shown) as analog signals, the image data lines include a first image data line (row_0) and a second image data line (row_1).

Specifically, the analog image frame buffer 11 according to the present invention can be combined with a pixel array (not shown), that is, the analog image frame buffer 11 and the pixel array occupy the same space. In this way, compared with the use of a digital image frame buffer, the digital image frame buffer and the pixel array are set separately and requiring additional space. The analog image frame buffer 11 in combination with the pixel array effectively reduces the space required by the image sensor.

Specifically, the line analog to digital converter 12 according to the present invention is electrically connected to the analog image frame buffer 11, the line analog to digital converter 12 converts the first image data line and the second image data lines from analog signals to digital signals.

Specifically, the line buffer memory 13 according to the present invention is electrically connected to the line analog to digital converter 12, and the image data lines to be converted into digital signals are stored in the line buffer memories 13.

Specifically, the interface 14 according to the present invention is electrically connected to the line buffer memories 13, the interface 14 sequentially outputs the image data lines according to the instructions provided by a master device 15, and the interface 14 can be a serial peripheral interface (SPI), but not limited to this.

It should be further explained that the data transmission system 1 of the present invention may have a complex line analog to digital converter 12, and the data transmission system 1 has the advantage of a complex digital converter 12 in that it can effectively increase the efficiency of converting the image data lines from analog signals to digital signals. However, this increases the number of the line buffer memories 13 at the same time, so that the data transmission system 1 occupies a larger space and increases the cost, and users can thus adjust the number of line analog to digital converters 12 and the line buffer memories 13 for different requirements.

Figure 2:
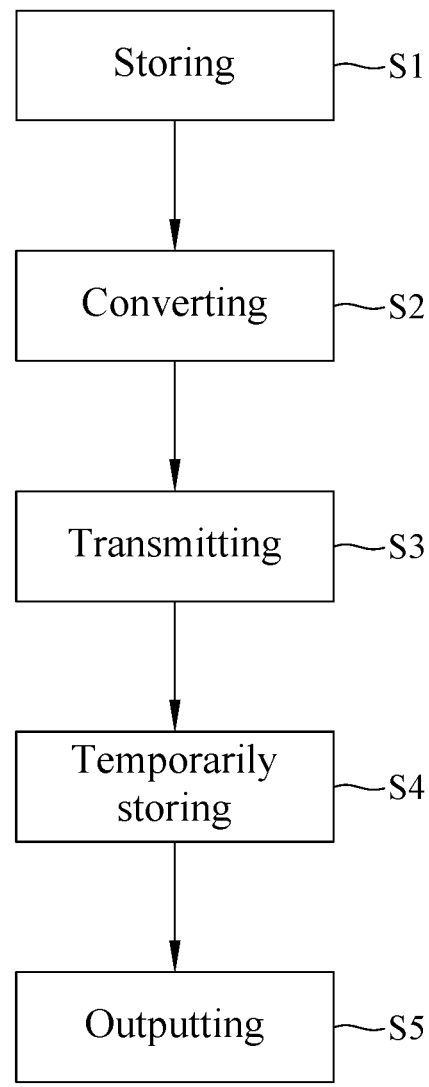
FIG. 2 is a flowchart illustrating steps of performing the method implemented for the data transmission system of the present invention.

Please refer to FIG. 2 in combination with FIG. 1. FIG. 2 is a flowchart illustrating the steps of the method for implementing the data transmission system of the present invention. The present invention is based on the above-mentioned data transmission system 1 and further provides an implementing method of the data transmission system 1, which includes the following steps:

First, in the storing step S1, the analog image frame buffer 11 stores a plurality of image data lines generated from the image sensor as analog signals.

Next, in the converting step S2, the line analog digital converters 12 converts the image data lines from analog signals to digital signals.

After that, in the transmitting step S3, the first image data line of digital signals is transmitted and stored in one of the line buffer memories 13.

Subsequently, in the temporarily storing step S4, the second image data line of digital signals is transmitted and stored in another line buffer memory 13.

Finally, in the outputting step S5, the interface 14 sequentially outputs the image signal lines of digital signals in the converting order of the line analog to digital converter 12 according to the instructions of the master device 15.

In this way, a data transmission system according to the present invention which applies the method thereof replaces a digital frame register originally required by an image sensor with line buffer memories with only two line analog to digital converters to perform image sensing technology and effectively reduce the size and cost of the image sensor.

In order to further understand the structural features, technical means and the expected effect of the present invention, the embodiments of the present invention are described here. It is believed that the invention can be understood more deeply and specifically.

First Embodiment

In the following, refer to the drawings, an embodiment of the first embodiment of the data transmission system of the present invention will be described.

Figure 3:
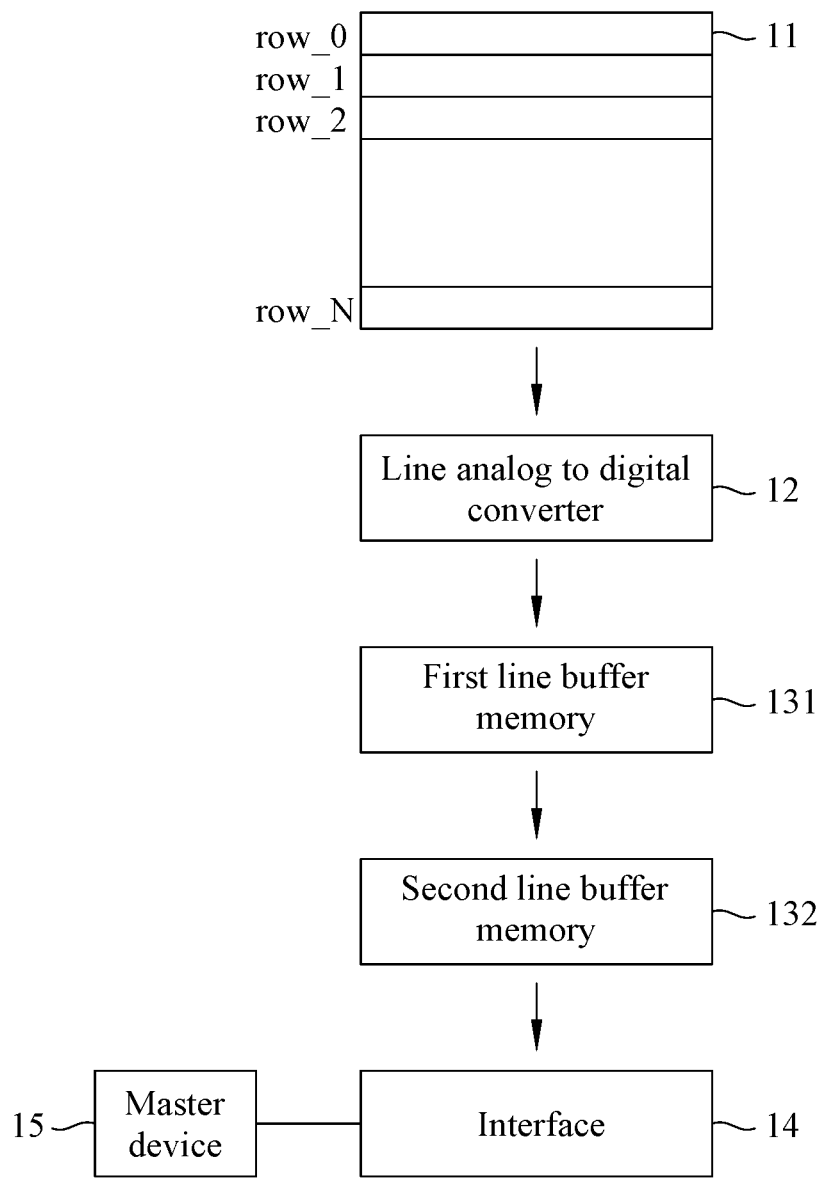
FIG. 3 is a schematic diagram of a data transmission system according to a first embodiment of the present invention.

FIG. 3 is a schematic diagram of a data transmission system according to a first embodiment of the present invention. As shown in FIG. 3, the data transmission system 1 according to the first embodiment of the present invention includes: an analog image frame buffer 11, a line analog to digital converter 12, a first line buffer memory 131, a second line buffer memory 132 and an interface 14.

Specifically, the analog image frame buffer 11 according to the first embodiment of the present invention stores a plurality of image data lines generated from an image sensor as analog signals, and the image data lines include the first image data line and the second image line.

Specifically, the line analog to digital converter 12 according to the first embodiment of the present invention is electrically connected to the analog image frame buffer 11. The line analog to digital converter 12 converts the first image data line and the second image line from analog signals to digital signals.

Specifically, according to the first embodiment of the present invention, the first line buffer memory 131 and the second line buffer memory 132 are both electrically connected to the line analog to digital converter 12, and the image data lines converted into the digital signals are stored in the line buffer memories.

Specifically, according to the first embodiment of the present invention, the interface 14 is electrically connected to the line buffer memories, and the interface 14 sequentially outputs the image data lines according to a command provided by a master device 15.

Specifically, according to the data transmission system 1 of the first embodiment of the present invention, wherein the interface 14 may be a serial peripheral interface, but not limited to this.

Figure 4:
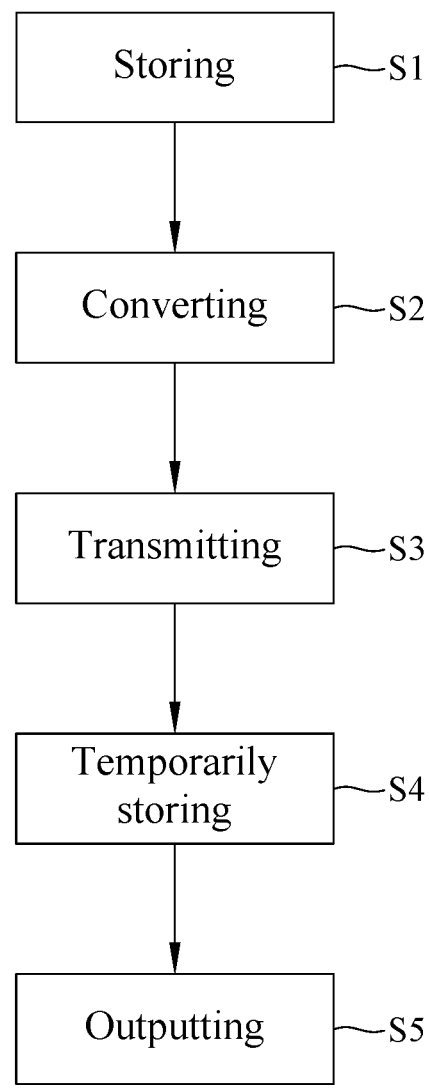
FIG. 4 is a flowchart illustrating steps of performing the method implemented for the data transmission system of the first embodiment of the present invention.

Please refer to FIG. 4 in combination with FIG. 3. FIG. 4 is a flowchart illustrating the steps of the method for implementing the data transmission system of the first embodiment of the present invention. The present invention is based on the above-mentioned data transmission system 1 and further provides an implementing method of the data transmission system 1, which includes the following steps:

Storing step S1: The analog image frame buffer 11 stores a plurality of image data lines generated from the image sensor as analog signals.

Converting step S2: The line analog to digital converter 12 converts the image data lines from analog signals to digital signals.

Transmitting step S3: The first image data line of digital signals is transmitted and stored in the first line buffer memory 131.

Temporarily storing step S4: The first image data of digital signals is transmitted from the first line buffer memory 131 to the second line buffer memory 132, and stored in the second line buffer memory 132.

Outputting step S5: The interface 14 sequentially outputs the image data lines of digital signals in the order of the conversion of the analog to digital converter 12 according to the instructions of the master device 15.

Figure 5:
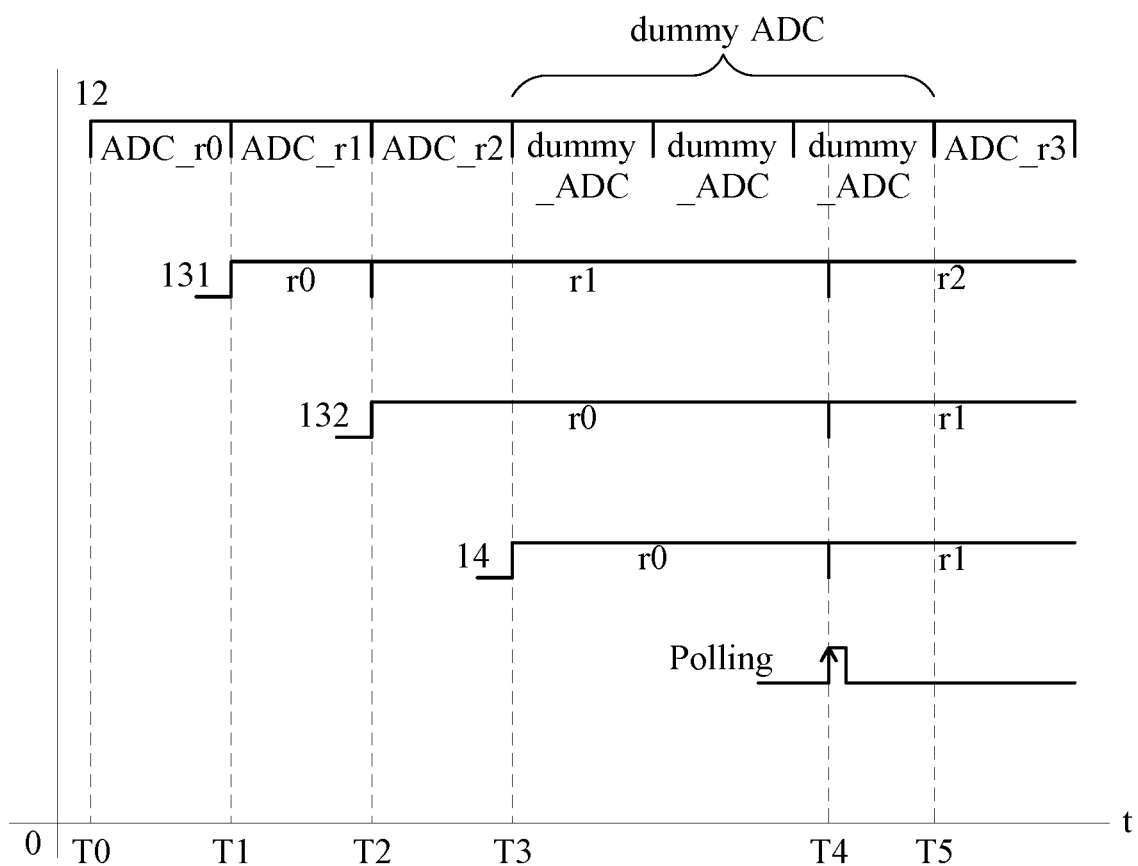
FIG. 5 is a signal timing diagram of the data transmission system according to the first embodiment of the present invention.

Please refer to FIG. 5, in combination with FIG. 3 and FIG. 4, FIG. 5 is a signal timing diagram of the data transmission system according to the first embodiment of the present invention. The explanation in the following is based on the data transmission system 1 of the first embodiment of the present invention described above and described in combination with the timing diagram.

First, the storage step S1 is performed by the analog image frame buffer 11, and the complex image data lines generated from the image sensor are stored as analog signals.

Next, the converting step S2 is performed by the line analog to digital converters 12, and the image data line is converted from analog signals to digital signals at a time point T0.

After that, the transmitting step S3 is performed, and the first image data line converted into a digital signal is stored in the first line buffer memory 131 at a time point T1.

Subsequently, the temporarily storing step S4 is performed, the first image data line of the digital signal stored in the first line buffer memory 131 is temporarily stored in the second line buffer memory 132 at the time point T2.

Finally, the interface 14 performs the outputting step S5 according to the instruction of the master device 15, the first image data line of digital signals is outputted at the time point T3, and the second image data line of digital signals is outputted at the time point T4.

It should be further explained that, in general, the converting frequency of the line analog to digital converter 12 is constant, as shown in FIG. 5, for example, the time lengths of ADC_r0 and ADC_r1 are equal and constant, and the time lengths of ADC_r1 and ADC_r2 are equal and constant, etc. However, since the interface 14 according to the present invention is a master-slave interface, the interface 14 must output the image data lines of digital signals according to the instructions of the master device 15, so when the conversion frequency of the line analog digital converter 12 is constant, before the interface 14 outputs the next image data line (that is, before the time point T4), the data stored in the second line buffer memory 132 cannot be updated from r0 to r1, and the data stored in the first line buffer memory 131 cannot be updated from r1 to r2. As described above, the above situation will cause the line analog to digital converter 12 in the above time period (that is, between the time point T3 and the time point T4), r3 in the analog image frame buffer 11 cannot be converted from analog to digital to generate ADC_r3, and this is because that the data of ADC_r2 has not been transmitted to the first line buffer memory 131 between the time point T3 and the time point T4, thus it is necessary to use dummy analog digital conversion (dummy ADC) to keep the conversion frequency of the line analog to digital converter 12 constant, that is, the image data lines converted by the line analog to digital converter 12 between time point T3 and time point T5 are virtual image data lines, and these virtual image data lines are not outputted by the interface 14. In this way, by introducing virtual analog to digital conversion, the present invention can make every analog to digital conversion occur regularly to avoid unexpected interference between different signals.

In addition, under the master-slave interface, after the master device 15 receives a data line, the interface 14 (that is, the slave device) may not complete the transmission of the next line data in some cases. Therefore, the master device 15 needs polling to confirm that the line buffer memory 13 is set.

Figure 6:
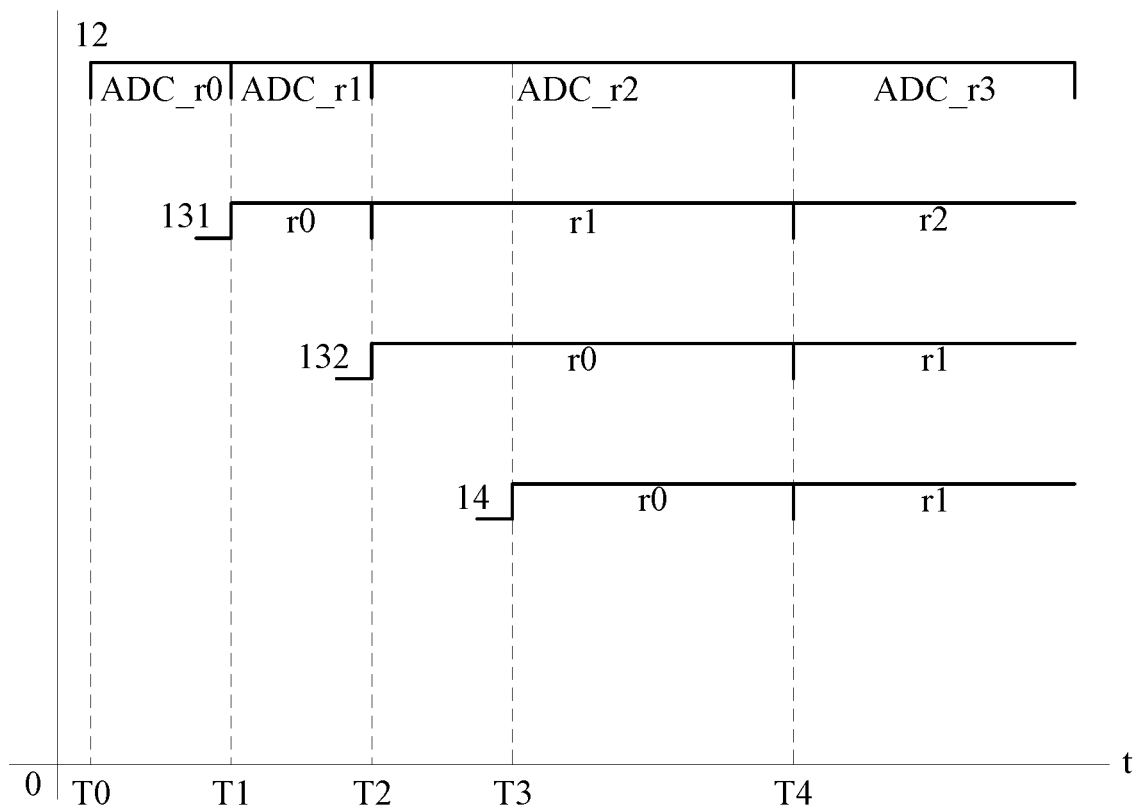
FIG. 6 is another signal timing diagram of the data transmission system according to the first embodiment of the present invention.

However, the present invention is not limited to this, and FIG. 6 is another signal timing diagram of the data transmission system according to the first embodiment of the present invention. As shown in FIG. 6, the conversion frequency of the analog to digital converter 12 according to the present invention may not be constant. It should be explained here that when the frequency or time length of the analog to digital conversion is not constant, the brightness of the resulting image will be inconsistent. For the conventional line analog to digital converter 12, the conversion frequency must be constant because the brightness of the presented image must be consistent. However, the data transmission system according to the present invention is mainly used as an application of image recognition, and the change in the image brightness has small effect on image recognition. Therefore, the conversion frequency of the line analog to digital converter 12 may not be constant, but may be adjusted according to the data transmission condition of the interface 14. In this way, the line analog to digital converter 12 according to the present invention may be omitted (or reduced) to perform the conversion of virtual image data lines, greatly increase the conversion efficiency of the line analog to digital converter 12, and reduce the complexity of data transmission in the interface 14. For example, the master device does not need polling to confirm whether the line buffer memory is set, but can continuously receive data without interruption, and it will effectively improve the applicability of the present invention.

Second Embodiment

Figure 7:
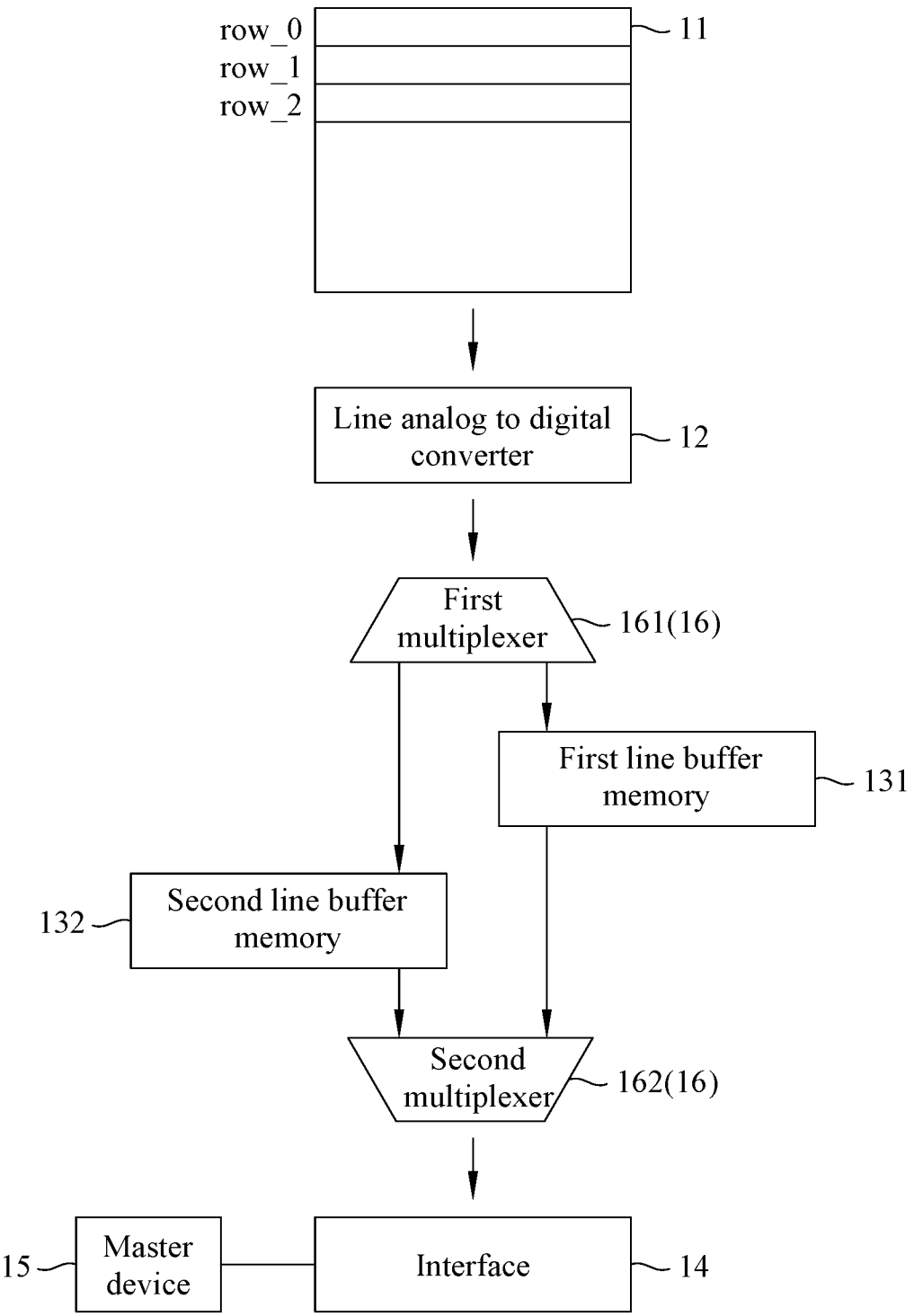
FIG. 7 is a schematic diagram of a data transmission system according to a second embodiment of the present invention.

Please refer to FIG. 7, FIG. 7 is a schematic diagram of a data transmission system according to a second embodiment of the present invention. Compared with the first embodiment, the second embodiment has a major structural difference in that the data transmission system 1 further includes at least two multiplexers 16, the multiplexers 16 include a first multiplexer 161 and a second multiplexer 162. The first multiplexer 161 is disposed between the line analog to digital converter 12 and the line buffer memories 13, and the first multiplexer 161 transmits the first image data line to one of the first buffer memory 131 and the second buffer memory 132, and then the first multiplexer 161 transmits the second image data line to the other one of the first buffer memory 131 and the second buffer memory 132. The second multiplexer 162 is disposed between the line buffer memories 13 and the interface 14, the second multiplexer 162 sequentially transmits the image data lines to the interface 14 in the order of the conversion of the line analog to digital converter 12.

In this way, the second embodiment can not only achieve the effects of the first embodiment, but also can provide different structures to enhance the applicability of the present invention.

Figure 8:
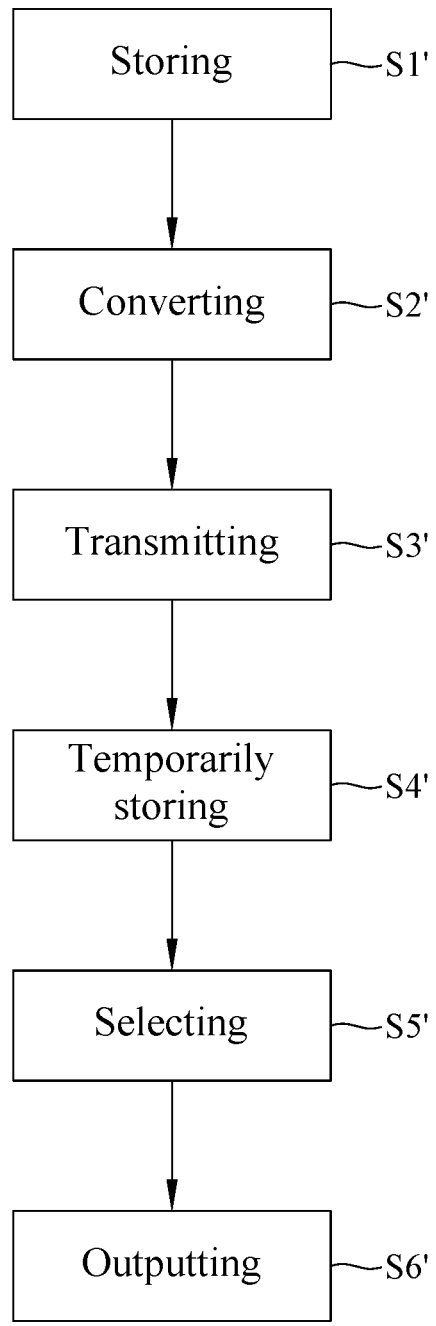
FIG. 8 is a flowchart illustrating steps of performing the method implemented for the data transmission system of the second embodiment of the present invention.

Please refer to FIG. 8, in combination with FIG. 7, which is a flowchart illustrating the steps of the method of implementing the data transmission system of the second embodiment of the present invention. In the present invention, the data transmission system 1 of the second embodiment described above is used as a basis, and a method of implementing the data transmission system 1 is provided. The system includes the following steps:

Storing step S1': The analog image frame buffer 11 stores a plurality of image data lines generated from the image sensor as analog signals.

Converting step S2': The line analog to digital converter 12 converts the image data lines from analog signals to digital signals.

Transmitting step S3': The first image data line of the digital signals is transmitted and stored in one of the first buffer memory 131 and the second buffer memory 132 by the first multiplexer 161.

Temporarily storing step S4': The second image data line of the digital signals is transmitted and stored in the other one of the first buffer memory 131 and the second buffer memory 132 by the first multiplexer 161.

Selecting step S5': the second multiplexer 162 sequentially transmits the image data lines of digital signals in the order of conversion of the line analog to digital converter 12 to the interface 14.

Outputting step S6': the interface 14 sequentially outputs the image data lines of the digital signals in the order of conversion of the line analog to digital converter 12 according to the instructions of the master device 15.

Figure 9:
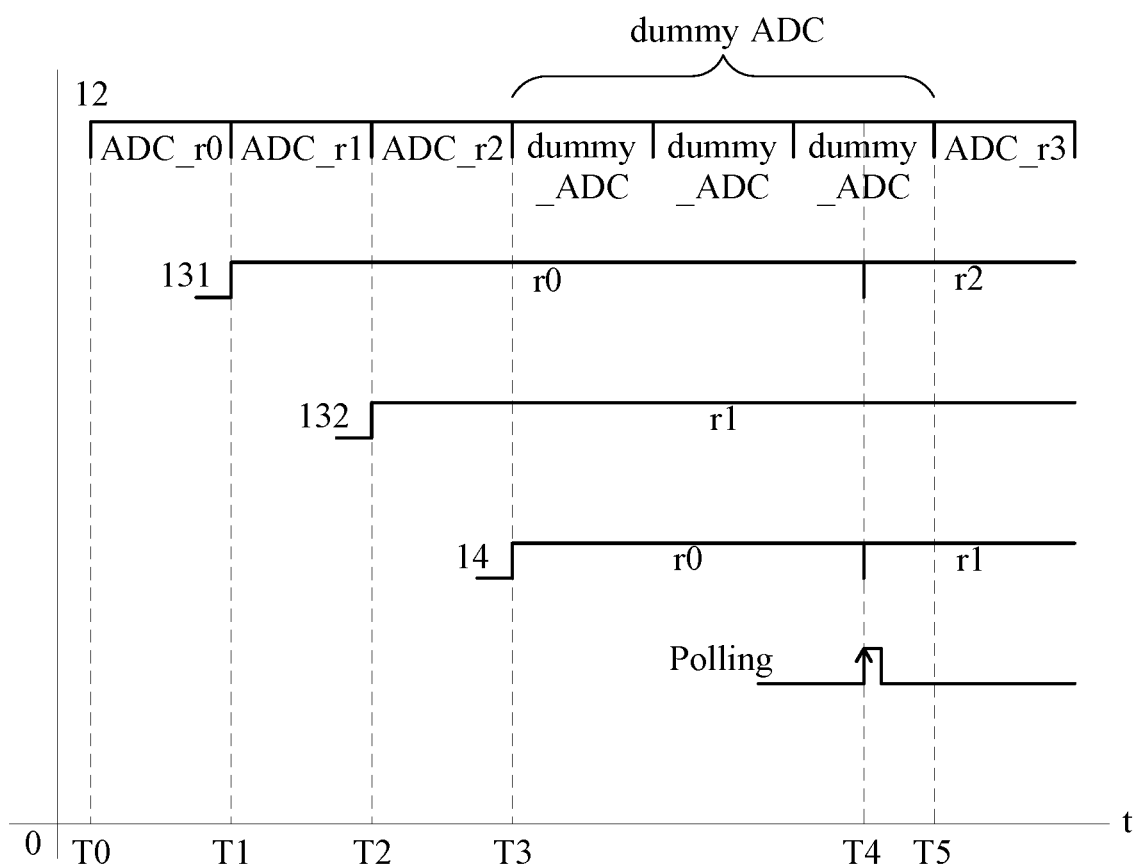
FIG. 9 is a signal timing diagram of the data transmission system according to the second embodiment of the present invention.

Please refer to FIG. 9, in combination with FIG. 7 and FIG. 8, FIG. 9 is a signal timing diagram of the data transmission system according to the second embodiment of the present invention. The explanation in the following is based on the data transmission system 1 of the second embodiment of the present invention described above and described in combination with the timing diagram.

First, the storage step S1' is performed by the analog image frame buffer 11, and the complex image data lines generated from the image sensor are stored as analog signals.

Next, the converting step S2' is performed by the line analog to digital converters 12, and the image data line is converted from analog signals to digital signals at a time point T0.

After that, the transmitting step S3' is performed by the first multiplexer 161, and the first image data line converted into a digital signal is stored in the first line buffer memory 131 at a time point T1.

After that, the transmitting step S4' is performed by the first multiplexer 161 and the second image data line converted into digital signals is stored in the second line buffer memory 132 at a time point T2.

Subsequently, the second multiplexer 162 performs the selecting step S5', the first image data line is transmitted to the interface 14.

Finally, the interface 14 performs the outputting step S6' according to the instruction of the master device 15, the first image data line of digital signals is outputted at the time point T3, and the second image data line of digital signals is outputted at the time point T4.

It should be further explained that, in general, the converting frequency of the line analog to digital converter 12 is constant, as shown in FIG. 9, for example, the time lengths of ADC_r0 and ADC_r1 are equal and constant, and the time lengths of ADC_r1 and ADC_r2 are equal and constant, etc. However, since the interface 14 according to the present invention is a master-slave interface, the interface 14 (i.e. slave device) must output the image data lines of digital signals according to the instructions of the master device 15, so when the conversion frequency of the line analog digital converter 12 is constant, before the interface 14 outputs the next image data line (that is, before the time point T4), the line analog to digital converter 12 has to use dummy analog digital conversion to keep the conversion frequency of the line analog to digital converter 12 constant, that is, the image data lines converted by the line analog to digital converter 12 between time point T3 and time point T5 are virtual image data lines, and these virtual image data lines are not outputted by the interface 14. In this way, by introducing virtual analog to digital conversion, the present invention can make every analog to digital conversion occur regularly to avoid unexpected interference between different signals.

In addition, under the master-slave interface, after the master device 15 receives a data line, the interface 14 may not complete the transmission of the next line data in some cases. Therefore, the master device 15 needs polling to confirm that the line buffer memory 13 is set.

Figure 10:
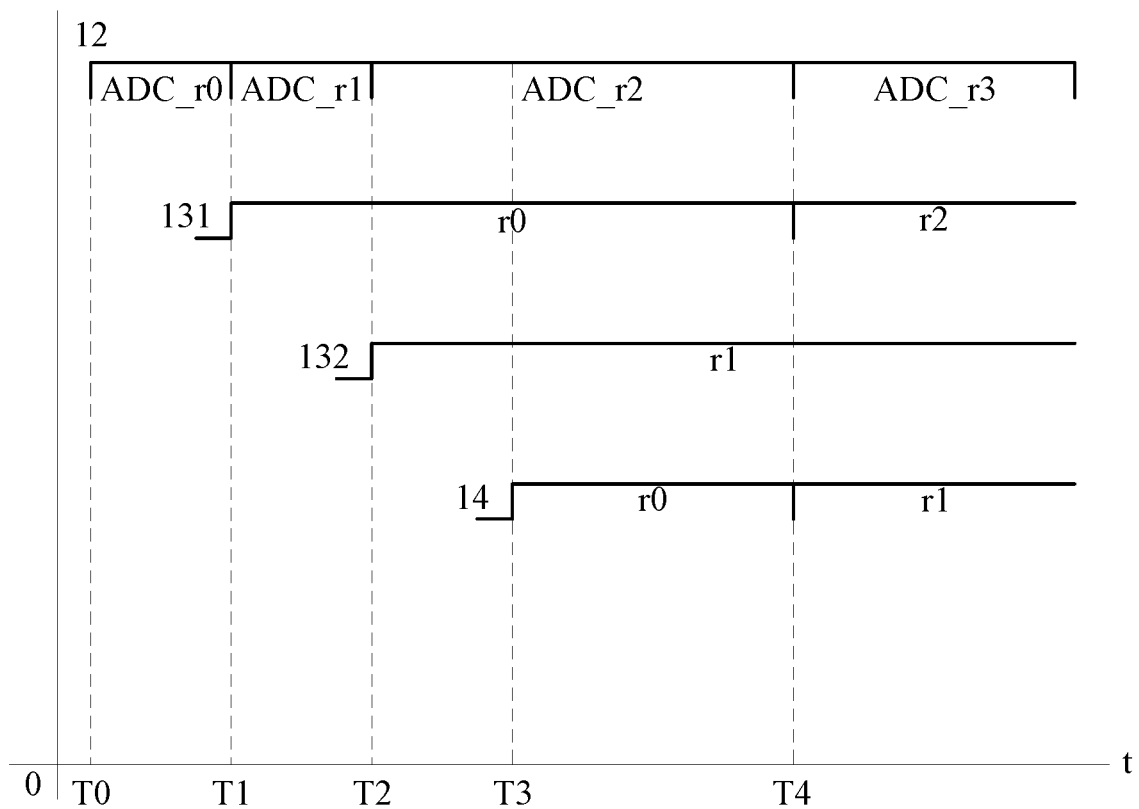
FIG. 10 is another signal timing diagram of the data transmission system according to the second embodiment of the present invention.

However, the present invention is not limited to this, and FIG. 10 is another signal timing diagram of the data transmission system according to the second embodiment of the present invention. As shown in FIG. 10, the conversion frequency of the analog to digital converter 12 according to the present invention may not be constant. It should be explained here that when the frequency or time length of the analog to digital conversion is not constant, the brightness of the resulting image will be inconsistent. For the conventional line analog to digital converter 12, the conversion frequency must be constant because the brightness of the presented image must be consistent. However, the data transmission system according to the present invention is mainly used as an application of image recognition, and the change in the image brightness has small effect on image recognition. Therefore, the conversion frequency of the line analog to digital converter 12 may not be constant, but may be adjusted according to the data transmission condition of the interface 14. In this way, the line analog to digital converter 12 according to the present invention may be omitted (or reduced) to perform the conversion of virtual image data lines, greatly increase the conversion efficiency of the line analog to digital converter 12, and reduce the complexity of data transmission in the interface 14. For example, the master device does not need polling to confirm whether the line buffer memory is set, but can continuously receive data without interruption, and it will effectively improve the applicability of the present invention.

In this way, the present invention has the following implementation and technical effects:

First, based on the data transmission system 1 of the present invention and the data transmission method provided by the present invention, a digital frame register originally required by the image sensor is replaced by the line buffer memories 13 with a number only greater than or equal to twice of that of the line analog to digital converters 12 to perform image sensing technology, and the data transmission system of the present invention reduces the space and cost required by the image sensor effectively.

Second, according to the data transmission system 1 of the embodiment of the present invention, compared with the digital image frame buffer used, the digital image frame buffer and the pixel array are set separately and require additional space, the analog image frame buffer 11 in combination with the pixel array allows the data transmission system of the present invention to effectively reduce the space required by the image sensor.

Third, according to the data transmission system 1 of the embodiment of the present invention, it only requires the first line buffer memory 131 and the second line buffer memory 132 in combination with the method provided by the present invention to perform the image sensing technology and thus greatly increases the applicability of the image sensor.

Fourth, the present invention makes the line analog to digital converter 12 save (or reduce) the generation of virtual image data lines, greatly increases the conversion efficiency of the line analog to digital converter 12 and improves the applicability of the data transmission system of the present invention by adjusting the frequency of the line analog to digital converter 12 converting the image data lines.

The above illustrates the embodiments of the present invention by specific examples, and those with ordinary knowledge in the technical field can easily understand other advantages and effects of the present invention by the contents disclosed in this specification.

The above are only preferred embodiments of the present invention and are not intended to limit the scope of the present invention; all other equivalent variations or modifications made without departing from the spirit of the present invention should be included in the scope of the following claims.

What is claimed is:

1. A data transmission system comprising:
   an analog image frame buffer storing a plurality of image data lines generated from an image sensor as analog signals, the image data lines including a first image data line and a second image data line;
   at least one line analog to digital converter electrically connected to the analog image frame buffer and converting the image data lines from analog signals to digital signals;

a first multiplexer connected to the at least one line analog to digital converter;

at least two line buffer memories electrically connected to the first multiplexer and storing the image data lines converted into digital signals in the line buffer memories, the line buffer memories including a first line buffer memory and a second line buffer memory;

a second multiplexer connected to the at least two line buffer memories; and an interface electrically connected to the second multiplexer and sequentially outputting the image data lines of the digital signals according to instructions of a master device;

wherein a number of the line buffer memories is larger than or equal to twice of a number of the at least one line analog to digital converters, the first image data line of the digital signals is transmitted and stored in one of the line buffer memories by the first multiplexer, the second image data line of the digital signals is transmitted and stored in another one of the line buffer memories by the first multiplexer, and the second multiplexer sequentially transmits the image data lines of the digital signals to the interface according to an order of conversion of the at least one line analog to digital converter.

2. The data transmission system of claim 1, wherein the data transmission system is applied to a complementary metal oxide semiconductor image sensor.

3. The data transmission system of claim 1, wherein a frequency of the at least one line analog to digital converter converting the image data lines is constant.

4. The data transmission system of claim 1, wherein a frequency of the at least one line analog to digital converter converting the image data lines is not constant.

5. The data transmission system of claim 1, wherein the analog image frame buffer is combined with a pixel array.

6. The data transmission system of claim 1, wherein the interface is a serial peripheral interface.

7. The data transmission system of claim 3, wherein the image data lines converted by the at least one analog to digital converter are dummy image data lines while the line buffer memories do not have space for storing more image data lines of the digital signals.

8. A data transmission method comprising:

a storing step using an analog image frame buffer to store a plurality of image data lines generated from an image sensor as analog signals, the image data lines including a first image data line and a second image data line;

a converting step using at least one line analog to digital converter to convert the image data lines from analog signals to digital signals;

a transmitting step transmitting and storing the first image data line of the digital signals in one of the at least two line buffer memories by a first multiplexer;

a temporarily storing step transmitting and storing the second image data line of the digital signals in another one of the at least two line buffer memories by the first multiplexer;

a selecting step using a second multiplexer to sequentially transmit the image data lines of the digital signals from the at least two line buffer memories to an interface according to an order of conversion of the at least one line analog to digital converter; and an outputting step using the interface to sequentially output the image data lines of the digital signals according to instructions of a master device.

9. The data transmission method of claim 8, wherein the data transmission method is applied to a complementary metal oxide semiconductor image sensor.

10. The data transmission method of claim 8, wherein a frequency of the at least one line analog to digital converter converting the image data lines is constant in the converting step.

11. The data transmission method of claim 8, wherein a frequency of the at least one line analog to digital converter converting the image data lines is not constant in the converting step.

12. The data transmission method of claim 8, wherein the analog image frame buffer is combined with a pixel array.

13. The data transmission method of claim 8, wherein the interface is a serial peripheral interface.

14. The data transmission method of claim 10, wherein in the converting step the image data lines converted by the at least one analog to digital converter are dummy image data lines while the line buffer memories do not have space for storing more image data lines of the digital signals.

* * * * *